United States Patent
Boroughs

(10) Patent No.: US 11,915,435 B2
(45) Date of Patent: Feb. 27, 2024

(54) RESAMPLED IMAGE CROSS-CORRELATION

(71) Applicant: Raytheon Company, Waltham, MA (US)

(72) Inventor: Grant B. Boroughs, Southlake, TX (US)

(73) Assignee: Raytheon Company, Tewksbury, MA (US)

( * ) Notice: Subject to any disclaimer, the term of this patent is extended or adjusted under 35 U.S.C. 154(b) by 102 days.

(21) Appl. No.: 17/378,113

(22) Filed: Jul. 16, 2021

(65) Prior Publication Data

US 2023/0016764 A1    Jan. 19, 2023

(51) Int. Cl.
  *G06T 7/32*   (2017.01)
  *G06T 7/215*  (2017.01)
  *G06T 7/38*   (2017.01)

(52) U.S. Cl.
  CPC ............ *G06T 7/32* (2017.01); *G06T 7/215* (2017.01); *G06T 7/38* (2017.01)

(58) Field of Classification Search
  CPC . G06T 7/30–38; G06T 3/0068; G06T 3/0075; G06T 3/0081
  See application file for complete search history.

(56) References Cited

U.S. PATENT DOCUMENTS 5,550,937 A * 8/1996 Bell .................. G06T 3/4038
                                                    382/293
5,640,200 A * 6/1997 Michael ............... G06T 7/32
                                                    382/160

(Continued)

FOREIGN PATENT DOCUMENTS

WO   WO-2022271963 A1   12/2022
WO   WO-2023287982 A1   1/2023

OTHER PUBLICATIONS

Bresnahan, Paul, et al., "WorldView-3 Geolocation Accuracy and Band Co-Registration Analysis", 2016 Joint Agency Commercial Imagery Evaluation (JACIE) Workshop, 45 pgs.

(Continued)

*Primary Examiner* — Ian L Lemieux
*Assistant Examiner* — Woo C Rhim
(74) *Attorney, Agent, or Firm* — Schwegman Lundberg & Woessner, P.A.

(57) ABSTRACT

A computer-implemented system and method of image cross-correlation improves the sub-pixel accuracy of the correlation surface and subsequent processing thereof. One or both of the template or search windows are resampled using the fractional portions of the correlation offsets X and Y produced by the initial image cross-correlation. The resampled window is then correlated with the other original window to produce a resampled cross-correlation surface. Removing the fractional or sub-pixel offsets between the template and search windows improves the "sameness" of the represented imagery thereby improving the quality and accuracy of the correlation surface, which in turn improves the quality and accuracy of the FOM or other processing of the correlation surface. The process may be iterated to (Continued)

improve accuracy or modified to generate resampled cross-correlation surfaces for multiple possible offsets and to accept the one with the most certainty.

27 Claims, 15 Drawing Sheets

(56) References Cited

U.S. PATENT DOCUMENTS

| | | | |
|---|---|---|---|
| 5,724,496 A | 3/1998 | Givens et al. | |
| 6,483,538 B2* | 11/2002 | Hu | G06T 7/32 348/189 |
| 7,787,655 B1* | 8/2010 | Cohen | G06T 7/33 382/209 |
| 7,970,170 B2* | 6/2011 | Tener | G06T 3/4038 382/294 |
| 8,155,452 B2* | 4/2012 | Minear | G06V 10/89 382/209 |
| 8,290,305 B2* | 10/2012 | Minear | G06T 7/32 348/580 |
| 9,165,361 B1* | 10/2015 | Ely | G06T 7/246 |
| 10,460,458 B1* | 10/2019 | Vakil | G06T 3/0068 |
| 2002/0159651 A1* | 10/2002 | Tener | G06T 5/50 382/209 |
| 2003/0026458 A1* | 2/2003 | Nahum | G06T 7/0004 382/106 |
| 2004/0005082 A1* | 1/2004 | Lee | G06T 3/0068 382/103 |
| 2004/0131281 A1* | 7/2004 | Reiners | G06V 10/32 382/302 |
| 2008/0002878 A1* | 1/2008 | Meiyappan | H04N 13/25 382/294 |
| 2008/0095407 A1* | 4/2008 | Stewart | G06T 7/33 382/284 |
| 2008/0165359 A1* | 7/2008 | Mattox | G01J 4/04 356/367 |
| 2008/0199078 A1* | 8/2008 | Lam | G06T 7/337 382/190 |
| 2009/0304288 A1* | 12/2009 | Rohaly | G06T 7/223 382/219 |
| 2010/0232728 A1* | 9/2010 | Leprince | G06T 7/593 382/294 |
| 2011/0293146 A1* | 12/2011 | Grycewicz | G06T 7/32 382/106 |
| 2012/0098986 A1* | 4/2012 | Robertson | H04N 19/577 348/222.1 |
| 2014/0111511 A1* | 4/2014 | Raif | G06V 20/176 345/420 |
| 2014/0112536 A1* | 4/2014 | Ely | G06T 15/506 382/103 |
| 2016/0188559 A1* | 6/2016 | Maltz | H04N 1/3873 358/1.15 |
| 2018/0089843 A1 | 3/2018 | Miecznik | |
| 2020/0020072 A1* | 1/2020 | Ely | G06T 3/4038 |
| 2020/0020115 A1* | 1/2020 | Ely | G06T 7/13 |
| 2020/0043134 A1* | 2/2020 | Martin | G06T 7/12 |
| 2021/0150206 A1 | 5/2021 | Bader | |
| 2022/0414376 A1 | 12/2022 | Boroughs et al. | |

OTHER PUBLICATIONS

Kaab, Andreas, "Vehicle Velocity From Worldview-2 Satellite Imagery", IEEE Geoscience and Remote Sensing Society (GRSS) Data Fusion Contest, (2011), 4 pgs.

Marchesi, Andrea, et al., "Detection of Moving Vehicles With Worldview-2 Satellite Data", The 33rd Asian Conference on Remote Sensing, (Nov. 2012), 9 pgs.

Salehi, Bahram, et al., "Automatic Moving Vehicles Information Extraction From Single-Pass WorldView-2 Imagery", IEEE Journal of Selected Topics in Applied Earth Observations and Remote Sensing, vol. 5, No. 1, (Feb. 2012), 135-145.

Sampath, Ajit, et al., "RCA-EO Jacie Satellite Sensor Characterization Methods", JACIE 2018, (Sep. 17, 2018), 25 pgs.

Tao, Jianwei, et al., "A Preliminary Study on Imaging Time Difference Among Bands of Worldview-2 and Its Potential Applications", Joint Agency Commercial Imagery Evaluation Civil Commercial Imagery Evaluation Workshop, Boulder, Colorado, (Mar. 30, 2011), 20 pgs.

Wang, Weixing, et al., "A review of road extraction from remote sensing images", Journal of Traffic and Transportation Engineering (English Edition) 2016; 3(3), (May 17, 2016), 271-282.

Xiong, Zhen, et al., "An Initial Study on Vehicle Information Extraction from Single Pass QuickBird Satellite Imagery", Photogrammetric Engineering & Remote Sensing, vol. 74, No. 11, (Nov. 2008), 1401-1411.

U.S. Appl. No. 17/358,850, filed Jun. 25, 2021, Automated Computer System and Method of Road Network Extraction From Remote Sensing Images Using Vehicle Motion Detection to Seed Spectral Classification.

"International Application Serial No. PCT/US2022/034750, International Search Report dated Oct. 7, 2022", 5 pgs.

"International Application Serial No. PCT/US2022/034750, Written Opinion dated Oct. 7, 2022", 7 pgs.

"International Application Serial No. PCT/US2022/037131, International Search Report dated Nov. 18, 2022", 4 pgs.

"International Application Serial No. PCT/US2022/037131, Written Opinion dated Nov. 18, 2022", 6 pgs.

Ager, Thomas P, et al., "Geopositional accuracy evaluation of QuickBird ortho-ready standard 2A multispectral imagery", SPIE Smart Structures and Materials + Nondestructive Evaluation and Health Monitoring, 2005, San Diego, California, United States, vol. 5425, (Aug. 12, 2004), 488.

Feng, Gao, et al., "Moving Vehicle Information Extraction from Single-Pass WorldView-2 Imagery Based on ERGAS-SNS Analysis", Remote Sensing, vol. 6, No. 7, (Jul. 16, 2014), 6500-6523.

Jordan, M, "High resolution stereo parallax determination using a neural network", Proceedings of SPIE, IEEE, US, vol. 1076, (Jan. 17, 1989), 123-130.

Scheffler, Daniel, et al., "AROSICS: An Automated and Robust Open-Source Image Co-Registration Software for Multi-Sensor Satellite Data", Remote Sensing, vol. 9, No. 7, (Jul. 1, 2017), 676.

Wen, Liu, et al., "Automated Vehicle Extraction and Speed Determination From QuickBird Satellite Images", IEEE Journal of Selected Topics in Applied Earth Observations and Remote Sensing, IEEE, USA, vol. 4, No. 1, (Mar. 1, 2011), 75-82.

* cited by examiner

RESAMPLED IMAGE CROSS-CORRELATION

GOVERNMENT LICENSE RIGHTS

This disclosure was made with government support under HM0476-17-D-0015. The government has certain rights in this invention.

BACKGROUND

Field

This disclosure relates to image cross-correlation, and more particular to a method of image cross-correlation that improves the sub-pixel accuracy of the resulting correlation surface, and any processing thereof including but not limited to assessing the confidence and uncertainty of the correlations.

Description of the Related Art

Image cross-correlation is the operation of computing an inner product of a first (template) window in a first (reference) image with the contents (pixel values) within a larger second (search) window in a second (target) image. Image cross-correlation is used to first identify X and Y correlation offsets where the windows are best aligned, evaluate the confidence in the correlation and then either accept or reject the correlation results. The most common application is to use the X and Y correlation offsets throughout the images as tie points for image registration. The tie points may also be used for bunle-adjustment in which errors in image metadata are corrected by performing a multi-ray intersection to common ground points.

As shown in FIGS. 1A-IC, a computer-implemented system 10 includes a non-transitory medium 12 (e.g. computer memory) that stores computer instructions and one or more processors that execute the instructions to perform a standard image cross-correlation (step 13) by first forming and sliding an M×M local template window 14 in a reference image 16 over all possible image positions (x,y) in an N×N search window 18 in a target image 20 where N>M. The inner product has a certain cost function for determining a cost at each image position. For example, Least Squares Correlation (LSC) or Normalized Cross Correlation (NCC) are traditional techniques for computing the cost function that expresses the similarity (or difference) between pixel values. The LSC uses a squared difference and the NCC uses an absolute value difference to compute the cost function. Variants of either the LSC or NCC or other cost functions may be used depending on the application The pixel cost is added to a running sum for the current template position to assign a total cost for the current template position. Low costs being representative of a positive correlation. The union of the total cost for all positions forms a correlation surface in x,y with a score in z. An Nth order curve fitting where N is typically 2 or more is performed to transform the discrete correlation surface with single pixel accuracy to a continuous correlation surface 22 with sub-pixel accuracy.

The computer-implemented system processes the continuous correlation surface 22 to extract a pair of correlation offsets X,Y 24 between the template window and search window (step 26). The continuous correlation surface will typically exhibit some form of a peak 28. The location of the peak typically provides the correlation offsets X and Y, which are represented as real numbers capable of representing fractional (sub-pixel) offsets. These offsets define the best alignment of the template and search windows.

The computer-implemented system will typically further process the continuous correlation surface to compute a Figure of Merit (FOM) for the correlation (step 30). A traditional approach would be to assess the quality of the peak at the offsets X and Y in the continuous correlation surface 22. The peak correlation score is an indicator of how good the match is overall. Also, the noise component of the result can be assessed by comparing the peak correlation score to the next-highest score that is at least a certain distance away from the peak. A certain distance range must be enforced to prevent using a secondary value that is in actuality part of the main peak. This distance limit can either be a defined value, or a fraction of the search area size, e.g., one-eighth of the search area size. The FOM is then used to accept or reject the correlation typically by comparison to a defined threshold value.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a computer-implemented system and method of image cross-correlation that improves the sub-pixel accuracy of the correlation surface and subsequent processing thereof. One or both of the template or search windows are resampled using the fractional portions of the pair of correlation offsets X and Y produced by the initial image cross-correlation. The resampled window is then correlated with the other original window to produce a resampled cross-correlation surface. Removing the fractional or sub-pixel offsets between the template and search windows improves the "sameness" of the represented imagery thereby improving the quality and accuracy of the correlation surface, which in turn improves the quality and accuracy of any subsequent processing thereof including but not limited to assessing the confidence and uncertainty of the correlations.

The cross-correlation process may be iterated one or more times to improve the accuracy of the pair of correlation offsets X and Y. Iteration may find a convergence or oscillation bounds that define the uncertainty of the correlation offsets. The fractional portion of the offset may be used as the FOM; if the fractional portion is within a specified tolerance of an integer value the correlation is accepted. Ideally, after the first iteration the correlation offsets X and Y should be integer valued. These integer-valued X and Y correlation offsets may be output with the resampled imagery and used, for example, to register multiple images (windows) without having to resample the original imagery again. This may provide a more efficient image registration or rendering of 3D objects.

The cross-correlation process may be modified to extract both first and second pairs of correlation offsets X and Y from the correlation surface, for example, from the highest and next highest peaks. Each pair is used to resample the imagery and generate a resampled correlation surface from which to compute a FOM. The pair of correlation offsets X and Y with the strongest FOM is accepted.

Resampled image cross-correlation may be adapted to provide for moving vehicle detection from a single multi-band image including a first set of band images and a second set of band images collected with a time lag relative to the first set. First and second pseudo-pan images are formed as a weighted average of one or more band images in the first set and a weighted average of one or more band images in the second set, respectively. The first pseudo-pan image is segmented into a plurality of local template windows each of which is correlated to a larger search window in the second pseudo-pan image and curve fit to produce a correlation surface. A pair of correlation offsets X and Y is extracted from the correlation surface for each local template window. Correlations where the correlation offsets X and Y are less than a first threshold are rejected as noise. The pixel values within the template window of the first pseudo-pan image or the search window of the second pseudo-pan image are resampled using the fractional portions of the X and Y correlation offsets. Using the resampled imagery, a local template window in the first pseudo-pan image is correlated to a search window in the second pseudo-pan image to produce a resampled correlation surface. A Figure of Merit (FOM) is computed for each of the correlations and used to accept correlations as detected moving vehicles in the single multi-band image. The resampled image cross-correlation may use a cost function and FOM specifically configured for moving vehicle detection. The "iteration" and "multiple correlation" techniques may also be adapted for moving vehicle detection.

These and other features and advantages of the disclosure will be apparent to those skilled in the art from the following detailed description of preferred embodiments, taken together with the accompanying drawings, in which:

DETAILED DESCRIPTION

Figure 1A:
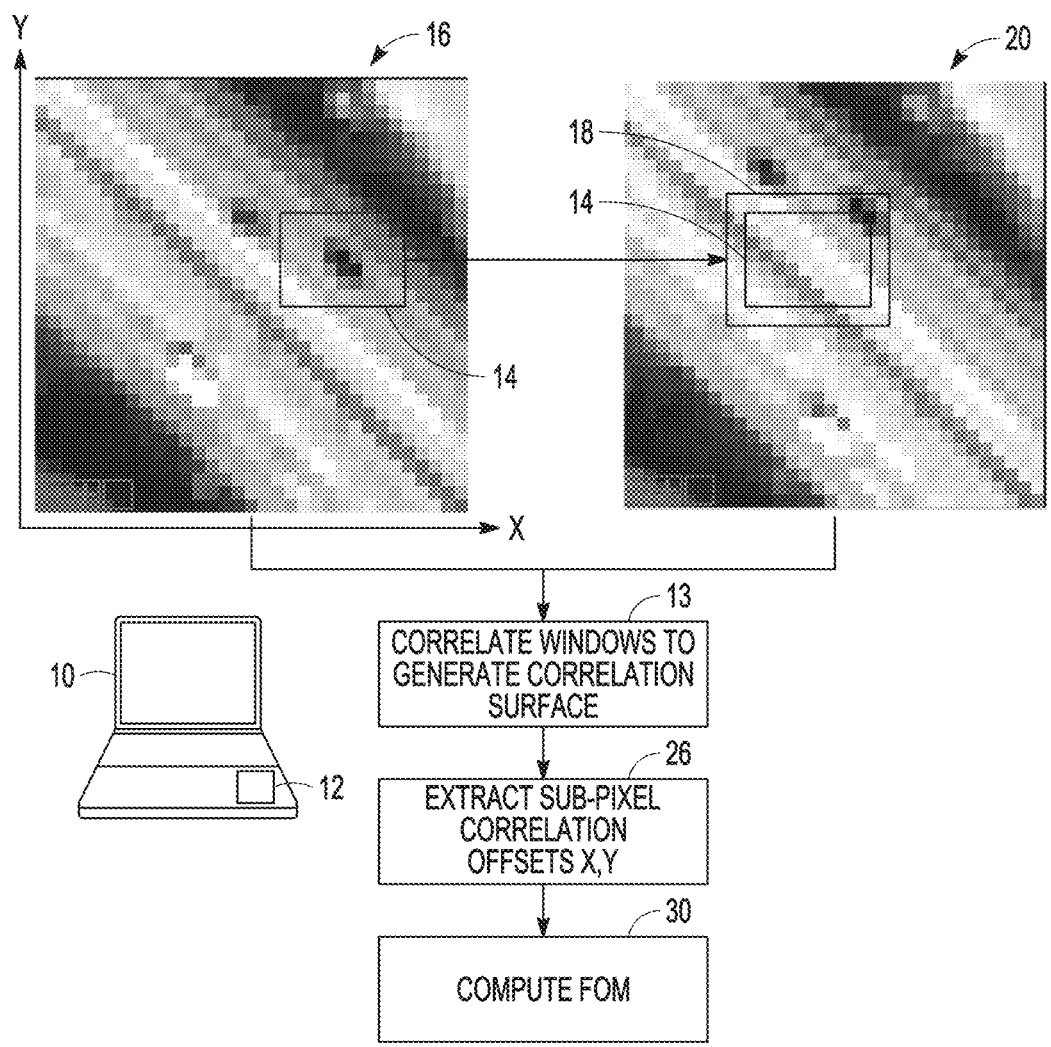
FIGS. 1A-1C, as described above, are a flow diagram of a computer-implemented process for a known image cross-correlation and plots of the correlation surface.
Figure 1B:
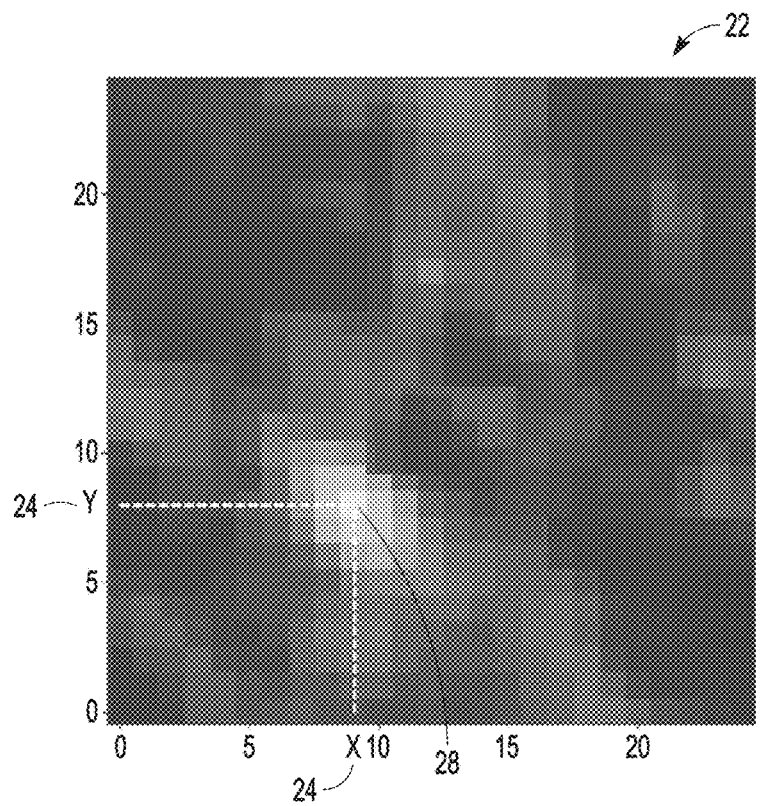
Figure 1C:
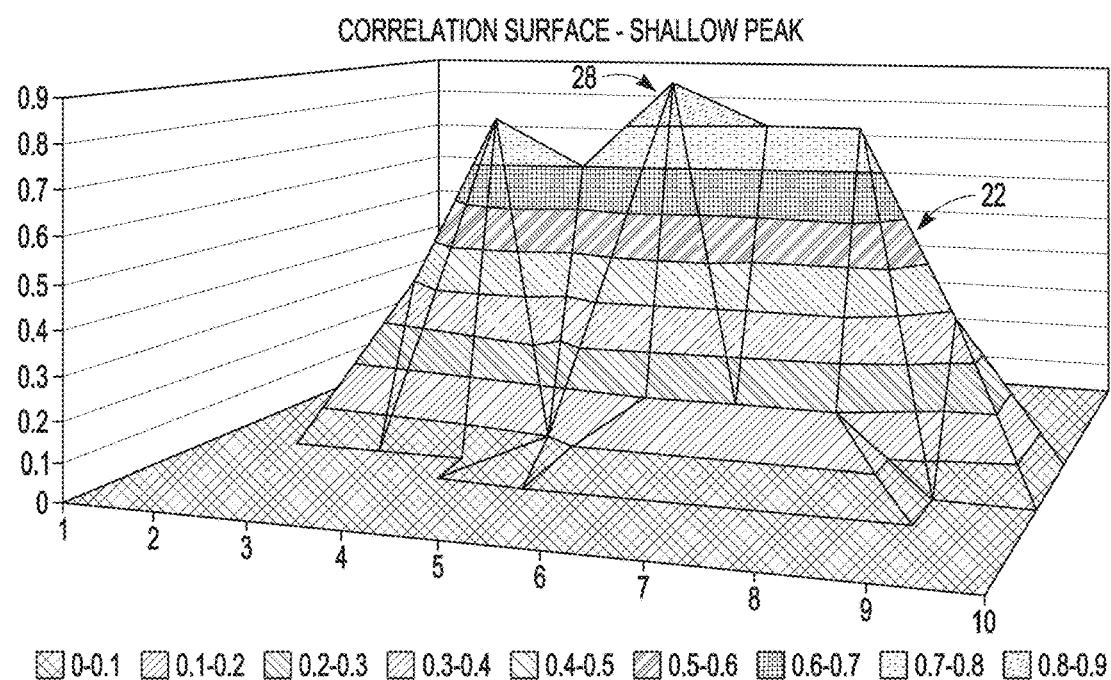
Figure 2A:
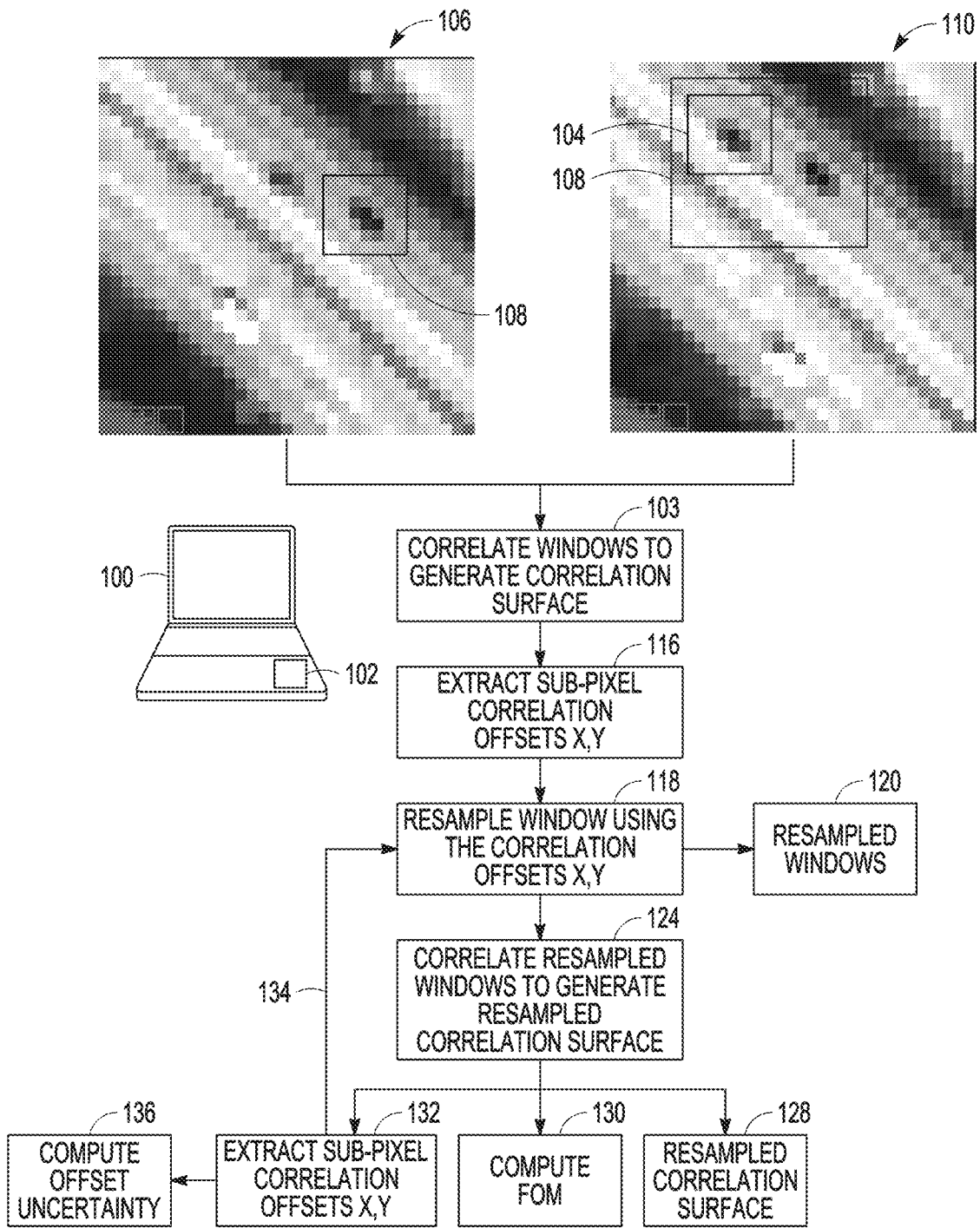
FIGS. 2A-2E are a flow diagram of a computer-implemented process for resampled image cross-correlation and plots of the initial and resampled correlation surfaces in accordance with the present disclosure to improve the accuracy of the correlation surface and any subsequent processing thereof.
Figure 2B:
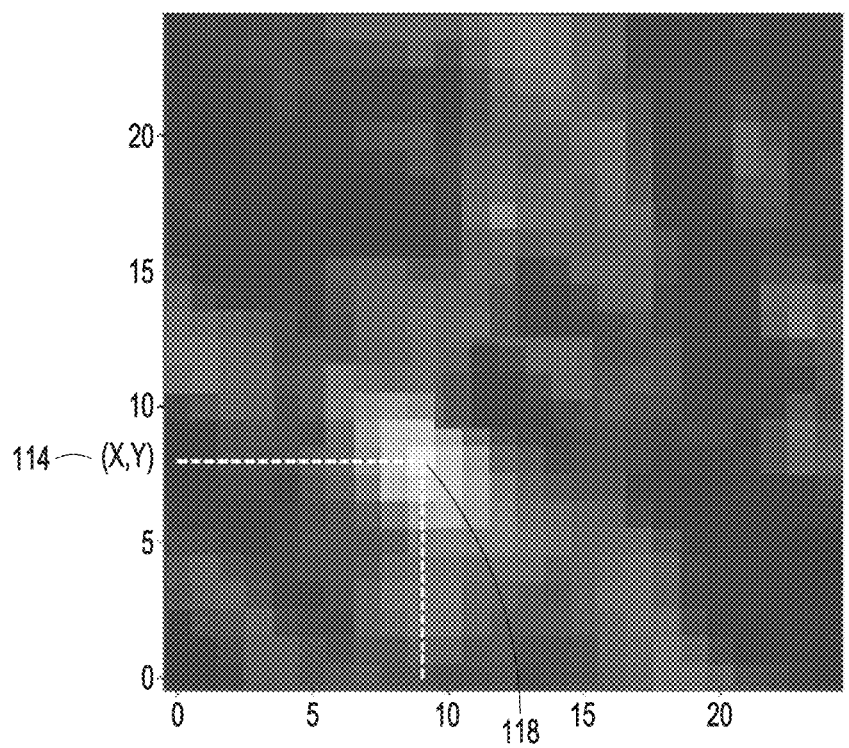
Figure 2C:
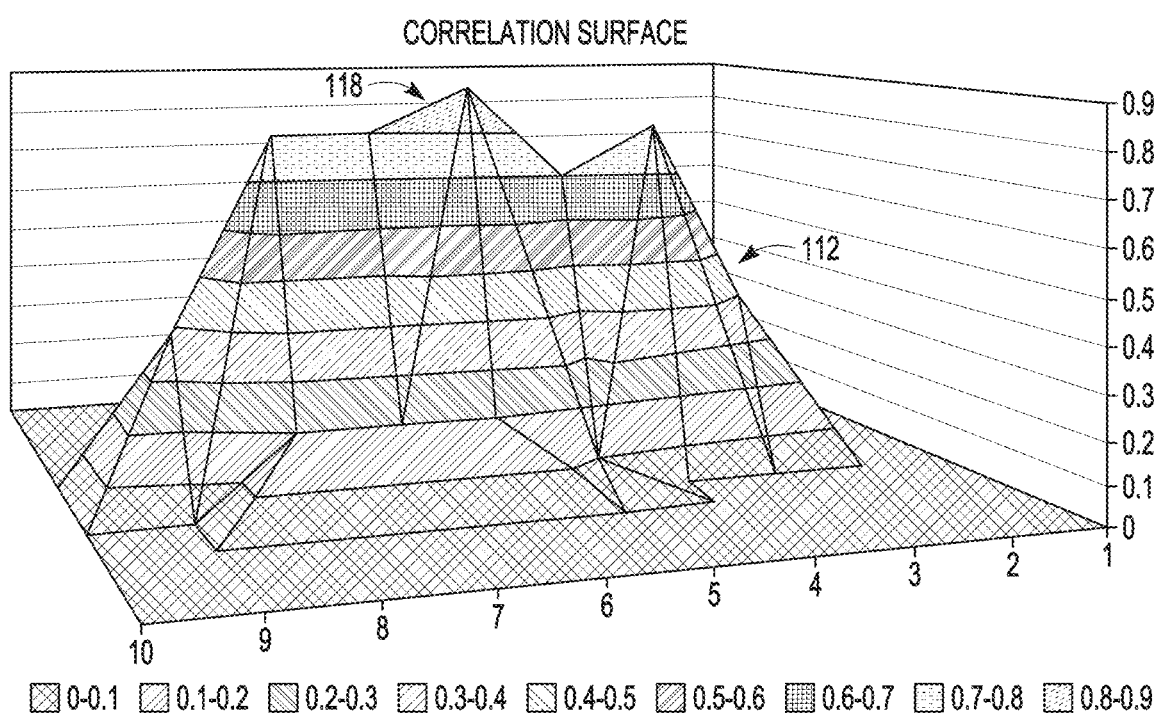
Figure 2D:
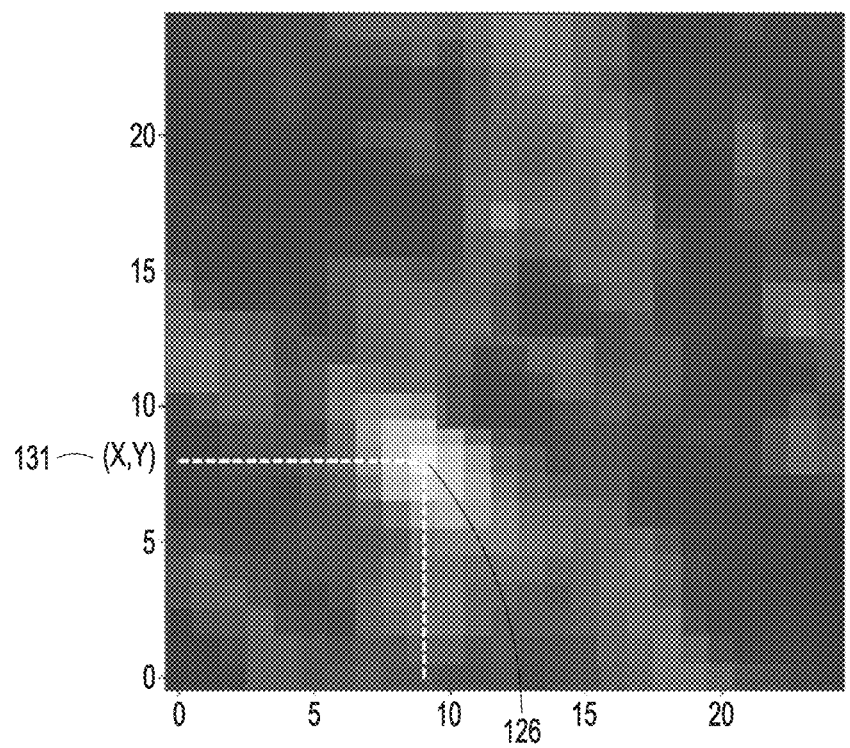
Figure 2E:
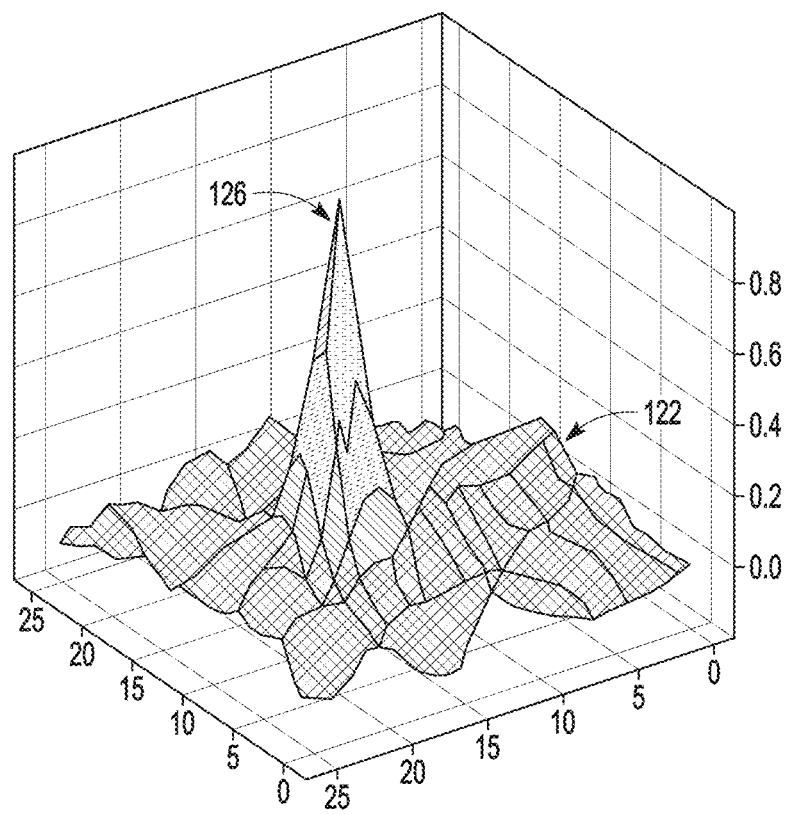

The present disclosure provides a computer-implemented system and method of image cross-correlation that improves the sub-pixel accuracy of the correlation surface and subsequent processing thereof including but not limited to assessing the confidence and uncertainty of the correlations. One or both of the template or search windows are resampled using the fractional portions of the pair of correlation offsets X and Y produced by the initial image cross-correlation. The resampled window is then correlated with the other original window to produce a resampled cross-correlation surface. Removing the fractional or sub-pixel offsets between the template and search windows improves the "sameness" of the represented imagery thereby improving the quality and accuracy of the correlation surface, which in turn improves the quality and accuracy of any subsequent processing. The resampling process may be iterated to improve the accuracy of correlation offsets X and Y and to form a measure of the uncertainty thereof. The resampling process may be applied to multiple pairs of correlation offsets X and Y extracted from the original correlation surface and the pair exhibiting the best FOM accepted. The residual fraction portion of the correlation offsets X and Y after resampling may itself be used as the FOM.

Referring now to FIGS. 2A-2E, a computer-implemented system 100 includes a non-transitory medium 102 (e.g. computer memory) that stores computer instructions and one or more processors that execute the instructions to perform an image cross-correlation (step 103) by first forming and sliding an M×M local template window 104 in a reference image 106 over all possible image positions (x,y) in an N×N search window 108 in a target image 110 where N>M. The inner product has a certain cost function for determining a cost at each image position. For example, Least Squares Correlation (LSC) or Normalized Cross Correlation (NCC) are traditional techniques for computing the cost function that expresses the similarity (or difference) between pixel values. The LSC uses a squared difference and the NCC uses an absolute value difference to compute the cost function. Variants of either the LSC or NCC or other cost functions may be used depending on the application The pixel cost is added to a running sum for the current template position to assign a total cost for the current template position. Low costs being representative of a positive correlation. The union of the total cost for all positions forms a correlation surface in x,y with a score in z. An Nth order curve fitting where N is typically 2 or more is performed to transform the discrete correlation surface with single pixel accuracy to a continuous correlation surface 112 with sub-pixel accuracy.

The computer-implemented system processes the continuous correlation surface 112 to extract a pair of correlation offsets X,Y 114 between the template window and search window (step 116). The continuous correlation surface will typically exhibit some form of a peak 118. The location of the peak typically provides the correlation offsets X and Y, which are represented as real numbers capable of representing fractional (sub-pixel) offsets. These offsets define the best alignment of the template and search windows 104 and 108.

The computer-implemented system uses the pair of correlation offsets X and Y, and specifically the fraction portions thereof, to resample at least one of the local template window 104 or the search window 108 (step 118). Resampling is accomplished by performing a curve fit or interpolated based on the original pixel values in a neighborhood around the pair of correlation offsets X and Y. For example, a bilinear ($2^{nd}$ order) or bicubic ($3^{rd}$ order) interpolation could be performed. Other interpolations may be used. Removing the fractional or sub-pixel offsets between the template and search windows improves the "sameness" of the represented imagery. The resampled windows may be output (step 120) and used for subsequent processing such as to register images or render 3D objects thereby avoiding the processing to resample that imagery again.

The computer-implemented system uses the resampled pixel values to correlate the local template window 104 in the reference image 106 to the larger search window 108 in the target image 110 to produce a resampled correlation surface 122 (step 124). At least one of the local template window 104 and the search window 108 will include the resampled pixel values from the previous step.

The result is that the resampled correlation surface 122 provides a more accurate depiction of the underlying correlation of the local template window to the search window for the pair of correlation offsets X and Y than the original correlation surface 112. As stated, resampling improves the "sameness" of the represented imagery, and thus improves the accuracy of the resultant correlation surface. That does not necessarily mean that the peak 126 in the resampled correlation surface 122 will be more well defined or "sharper" than the peak 118 in the original correlation surface 112 but rather that the structure of the peak will more accurately represent the underlying correlation. The resampled correlation surface may indicate a more, less or same confidence than the original correlation surface.

The computer-implemented system may output the resampled correlation surface (step 128) for additional processing. More typically, the computer-implemented system will compute a FOM for the resampled correlation surface (step 130). If the FOM satisfies a criteria, the correlation is accepted, otherwise it is rejected. This FOM can be one of the standard FOM based on the height of the highest peak and or the highest and next highest peak or an application-specific FOM. The FOM is then used to accept or reject the correlation typically by comparison to a defined threshold value.

In theory, correlation offsets X and Y 131 extracted from the resampled correlation surface should be integer valued (step 132), i.e., the integer portions of the initial offsets X and Y. This relationship may be used in a variety of ways. First, if the re-extracted correlation offsets X and Y are integer-valued (or close enough), then the system can output the resampled windows (step 120) with the integer-valued correlation offsets X and Y. Second, the magnitude of any residual fractional portion of the re-extracted correlation offsets X and Y can be used as the FOM. If the offsets are near integer-valued that is an indicator that the correlation is accurate. More specifically, if the magnitude of the fractional portions is less than a threshold the correlation is accepted.

The computer-implemented system may iterate the resampling process (steps 118, 124) with the correlation offsets X and Y extracted from the resampled correlation surface in step 132 to improve the accuracy of the final correlation offsets X and Y, hence the accuracy of the final resampled correlation surface (step 134). Since every iterative offset is measured relative to the current resampled imagery, a running sum of the offsets over all iterations is used to provide the absolute offset between the original image windows. The final correlation offsets X and Y may find a convergence of oscillation bounds that define an uncertainty in the correlation offsets (step 136).

As mentioned, the resampling process may produce a resampled correlation surface, and hence FOM, that indicate a low confidence in the original pair of correlation offsets X and Y. Accordingly, the computer-implemented system may be configured to extract multiple pairs of correlation offsets X and Y in step 116 from the initial correlation surface. For example, the system may extract correlation offsets from the highest and next highest peaks or from the highest peak and the next highest peak that is at least a radius R away from the highest peak. In this case, the computer-implemented system resamples the pixel values of the template and/or search windows for each of the first and second pairs of correlation offsets X and Y in step 118 and uses the resampled pixel values to correlate the windows to generate first and second resampled correlation surfaces in step 124. The system computes a FOM 130 for each of the resampled correlation surfaces and accepts the correlation (and pair of correlation offsets X and Y) with the strongest FOM (assuming it independently satisfies a threshold condition for acceptance).

Figure 3A:
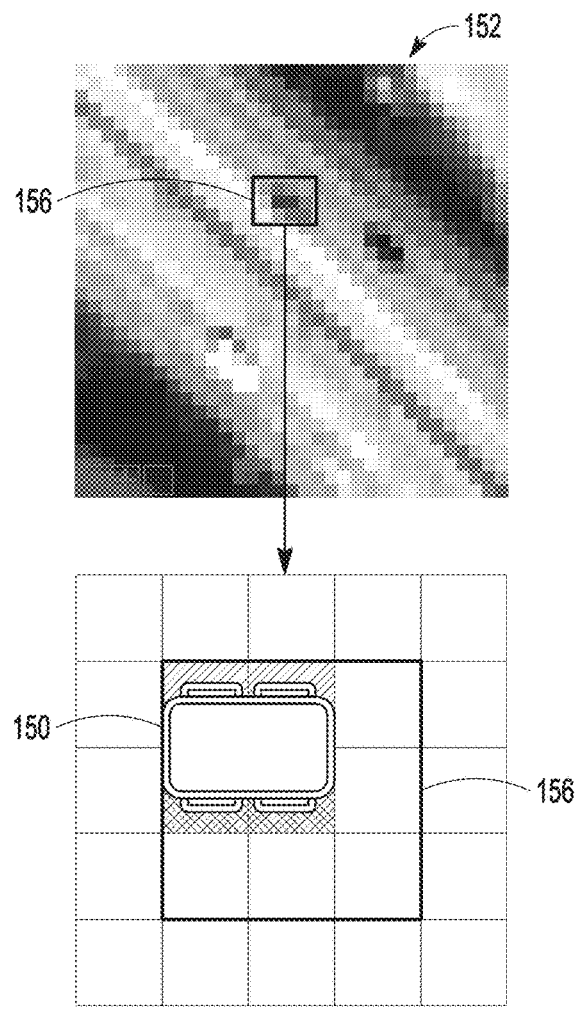
FIGS. 3A-3B are diagram illustrating the resampling of the pixel values in accordance with the correlation offsets X and Y to improve the "sameness" of the object captured in the local template and search windows.
Figure 3B:
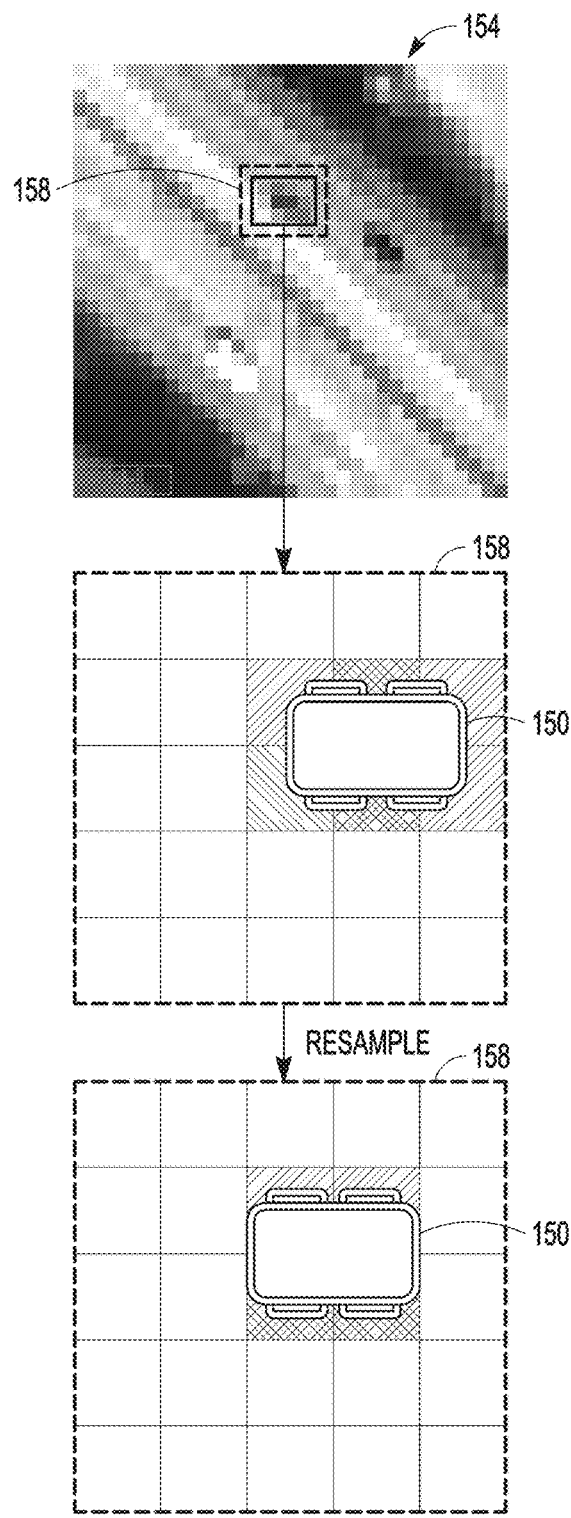

Reference is now made to FIGS. 3A-3B, 4A-4B and 5A-5B, in which a vehicle 150 has moved positions between a reference image 152 and a target image 154. A 3×3 local template window 156 in reference image 152 is correlated with a 5×5 search window 158 in target image 154. The pixel footprints will partially overlap the edges of the vehicle resulting in mixed pixels that include both the vehicle and the background. As shown in FIGS. 3A-3B vehicle 150, which occupies 2×2 pixels, is centered on 2×2 pixels in the 3×3 local template window 156 but is offset by a sub-pixel amount and center in a 2×3 portion of the 5×5 search window 158. After resampling, vehicle 150 is centered in a 2×2 portion of the search window 158 thereby improving the "sameness" of the representation of the vehicle in both the local template and search windows, which in turn yields a more accurate correlation surface.

Figure 4A:
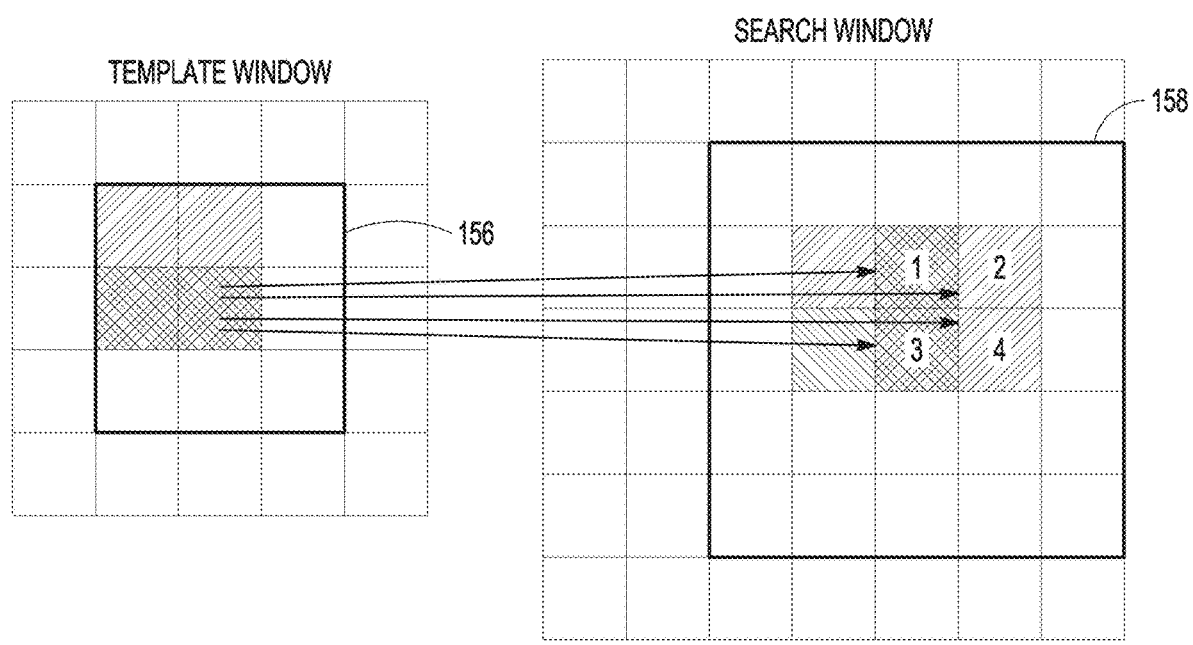
FIGS. 4A-4B are diagrams illustrating the initial cross-correlation to generate the correlation surface.
Figure 4B:
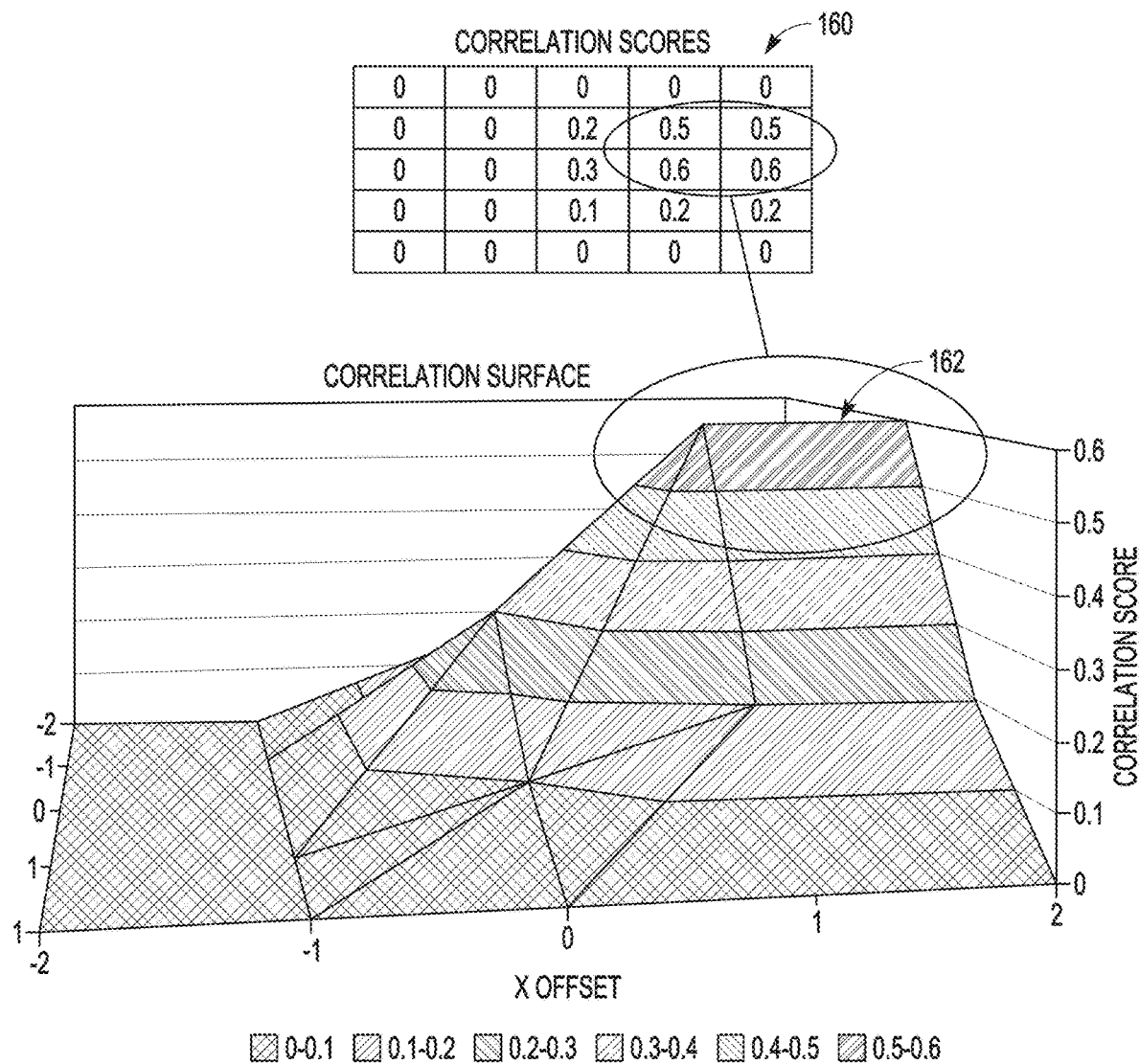

Referring now to FIGS. 4A-4B, when correlating the inner 3×3 pixels from the template window 156 to the search window 158, positions 1 and 2 will have very similar scores, and positions 3 and 4 will have very similar scores as shown in Table 160. Therefore, the initial correlation scores, and curve fit correlation surface 162 will not have a clear sharp peak. In this example, the correlation surface 162 should exhibit a clear sharp peak representing the correlation of the vehicle.

Figure 5A:
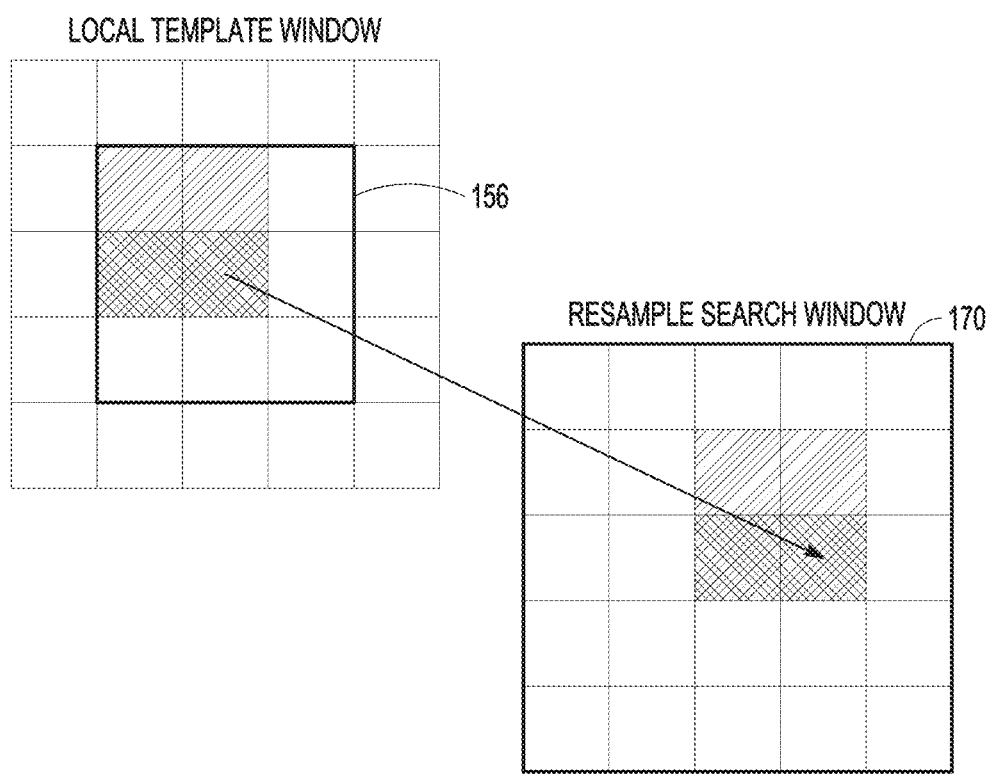
FIGS. 5A-5B are diagrams illustrating the resampling of the pixel values and the subsequent cross-correlation to generate the resampled correlation surface.
Figure 5B:
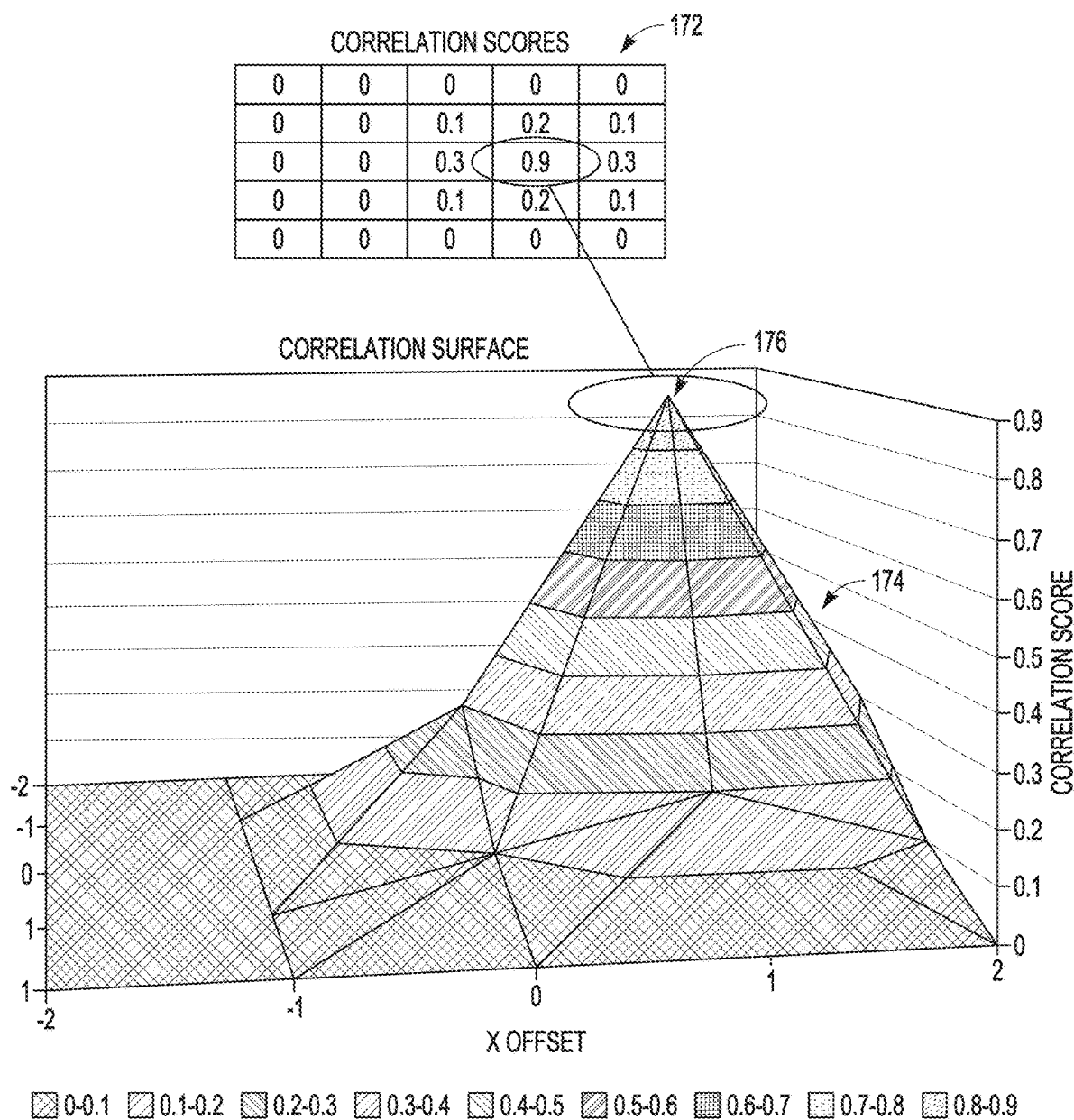

Referring now to FIGS. 5A-5B, the system has resampled the pixel values for the 5×5 search window 158 using the pair of correlation offsets X and Y to produce a resampled sampled search window 170. When correlating the inner 3×3 pixels from the template window 156 to the resampled search window 170, only a single position will have a clearly higher score than the rest of the positions as shown in Table 172. Therefore, the resampled correlations scores, and curve fit resampled correlation surface 174 will exhibit a clear sharp peak 176. The clear sharp peak improves the confidence (e.g., FOM) in the correlation and extracted correlation offsets as it should in this example.

As previously mentioned, the resampling can be applied to the local template window, the search window or a combination thereof. In this example, the search window was resampled thereby aligning the vehicle to a 2×2 footprint in the window and improving the "sameness" of the content as represented in the local template and search windows. If instead the local template window had been resampled, the vehicle would have been aligned to a 2×3 footprint in the window also improving the "sameness" of the content for purposes of correlation.

Figure 6:
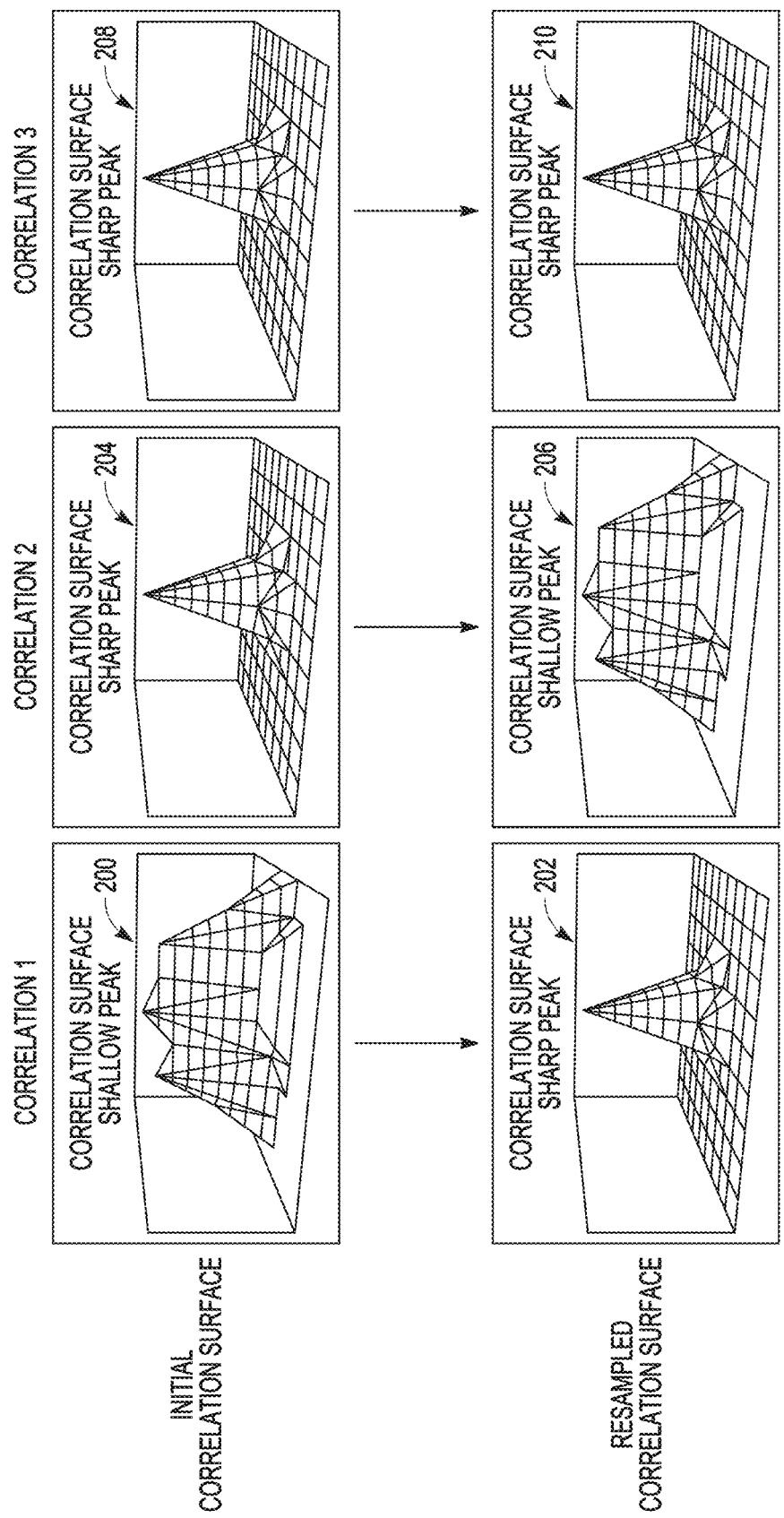
FIG. 6 illustrates the initial and resampled correlation surfaces for different windows to illustrate the effects of resampling.

Referring now to FIG. 6, resampled image cross-correlation improves the accuracy of the correlation surface, and hence the confidence in the underlying correlation. This can mean that the underlying correlation corresponding to a pair of correlation coefficients X and Y is either good or bad, and should be accepted or rejected. As shown, for a first correlation the initial correlation surface 200 does not exhibit a clear sharp peak, and would produce a weak FOM leading to rejection of the correlation. However, the resampled correlation surface 202 does exhibit a clear sharp peak, and would produce a strong FOM leading to acceptance of the correlation. In this case, resampling identifies and selects a good correlation that would have been rejected. For a second correlation the initial correlation surface 204 does exhibit a clear sharp peak, and would produce a strong FOM leading to acceptance of the correlation. However, the resampled correlation surface 206 does not exhibit a clear sharp peak, and would produce a weak FOM leading to rejection of the correlation. In this case, resampling identifies rejects false correlations. For a third correlation the initial correlation surface 208 does exhibit a clear sharp peak, and would produce a strong FOM leading to acceptance of the correlation. The resampled correlation surface 210 also exhibit a clear sharp peak, and would produce a strong FOM leading to acceptance of the correlation. In this case, resampling confirms the initial correlation.

Figure 7A:
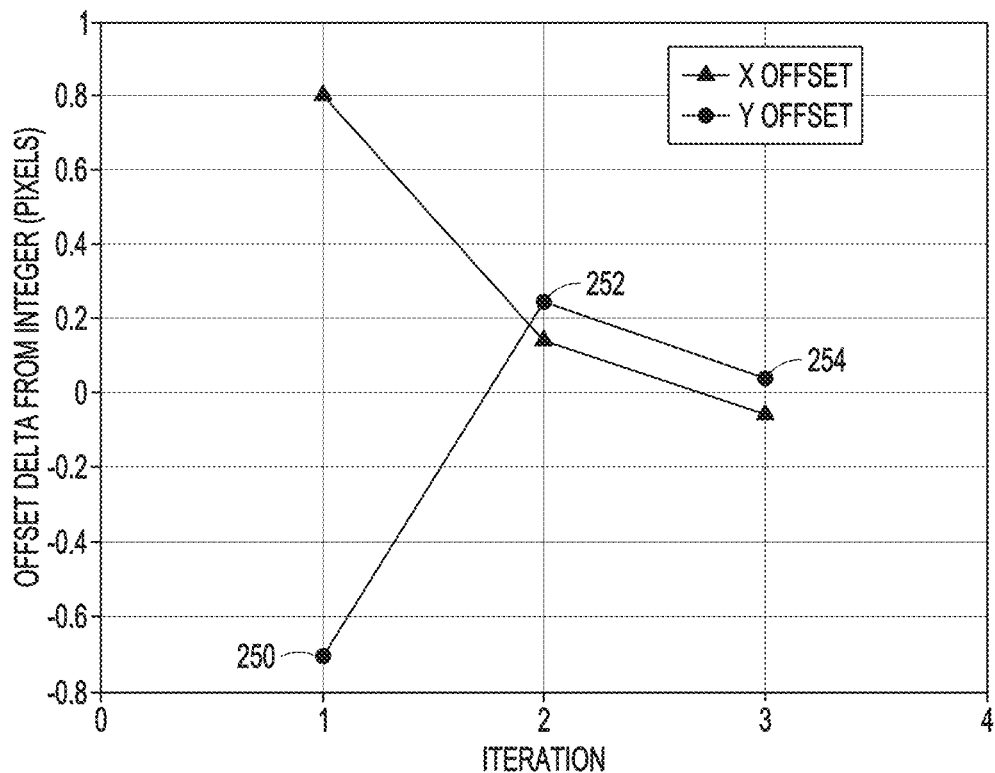
FIGS. 7A-7B are plots illustrating the convergence of the correlation offset X and Y with iteration of the resampled image cross-correlation process, and use of the convergence limits to estimate uncertainty.
Figure 7B:
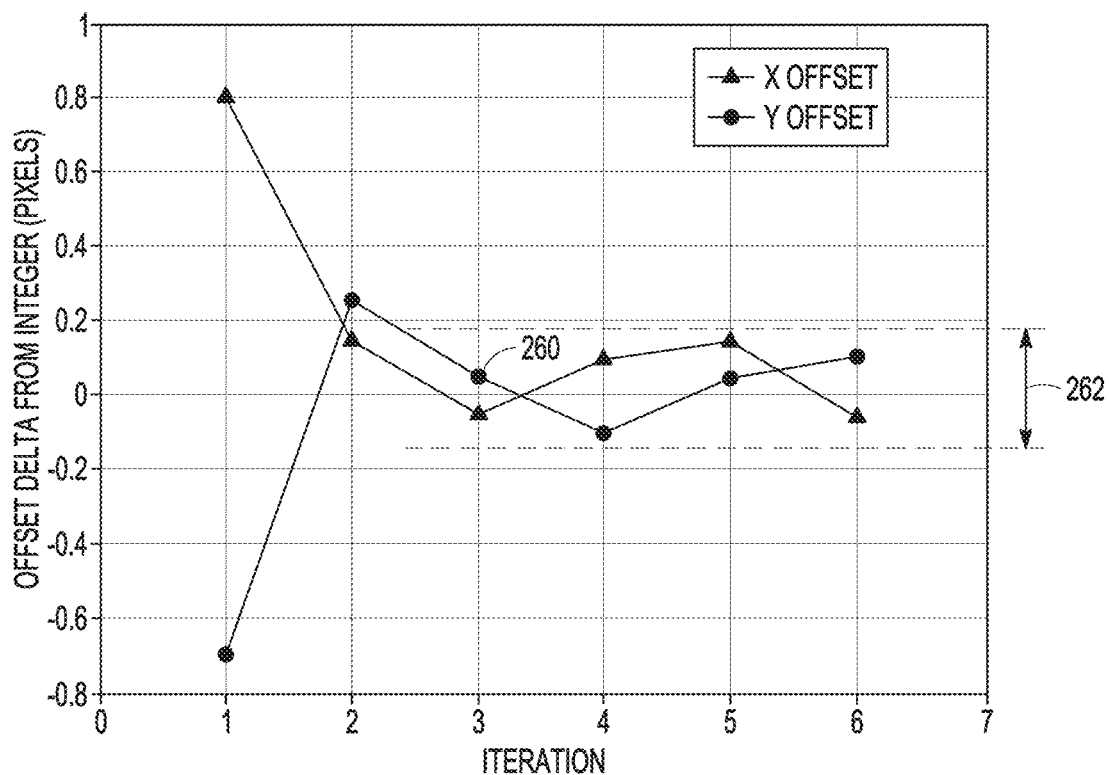

Referring now to FIGS. 7A-7B, the resampling and correlation process may be iterated once, for a fixed number of times or until the correlation offsets X and Y converge. At each iteration, the correlation offsets X and Y are re-extracted from the new resampled correlation surface. This can be done to improve the accuracy of the sub-pixel correlation offsets X and Y. In theory, after the first iteration the correlation offsets X and Y should be integer-valued. However, the presence of noise or inaccuracy of the underlying correlation can result in the correlation offsets X and Y having sub-pixel or fractional portions. Furthermore, iterating the process may find a convergence or oscillation bounds that define the uncertainty in the correlation offsets. Since every iterative offset is measured relative to the current resampled imagery, a running sum of the offsets over all iterations is used to provide the absolute offset between the original image windows.

As shown in FIG. 7A, the initial correlation offsets 250 are used to resample and re-correlate, resulting in new offsets 252. This process can be repeated to recover additional sub-pixel components of the true offset 254. Iteration can continue until a convergence condition is met (e.g., offsets are within threshold T1 of the nearest integer, or the offsets' change between iterations is less than threshold T2), or until oscillation occurs. The oscillation shown in FIG. 7B is a new technique of measuring the uncertainty in the correlation accuracy. After converging to satisfactory correlation offsets 260, an additional N iterations are performed to provide a variation range 262 that occurs due to noise and the resolution limits of the image data. This range can be used as an uncertainty measurement in the correlation offset accuracy, which has applications such as computing speed uncertainty for moving objects.

Figure 8A:
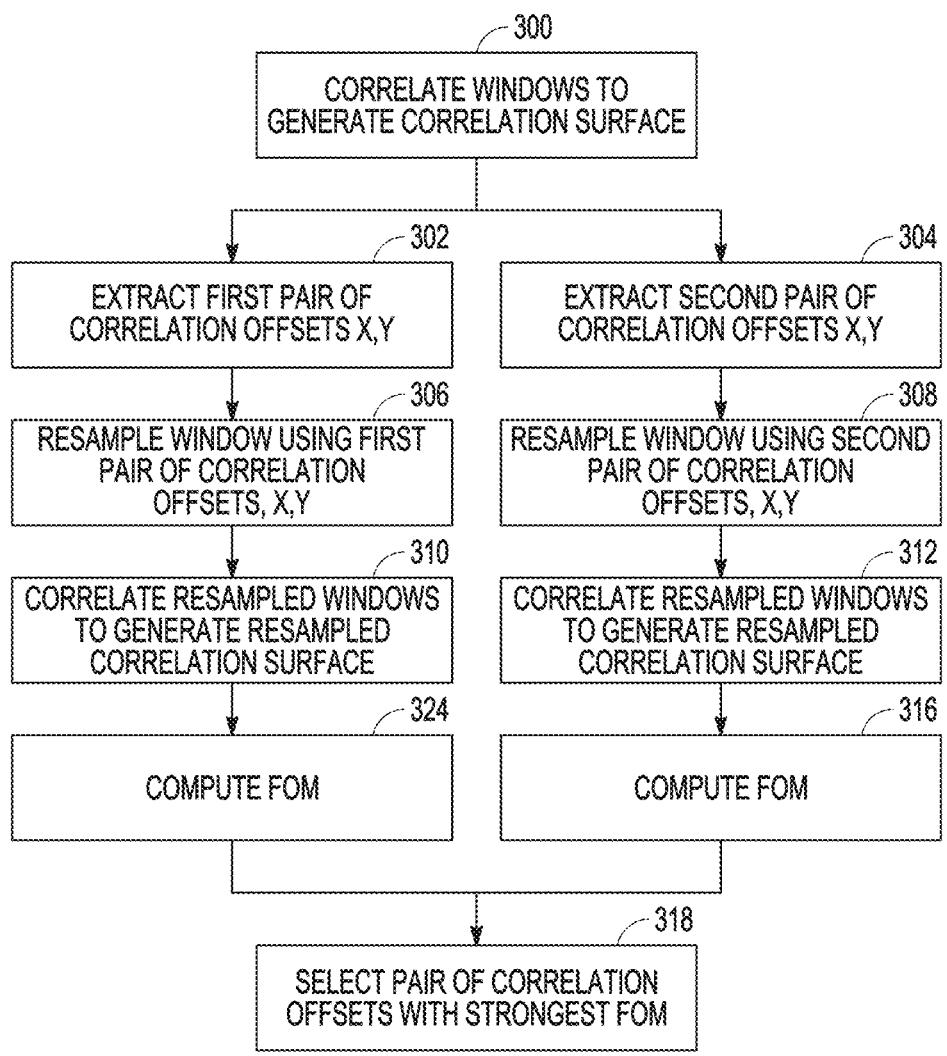
FIGS. 8A-8B are a flow diagram and plot illustrating the processing of multiple peaks within the initial correlation surface to identify the peak and correlation offsets with the highest FOM.
Figure 8B:
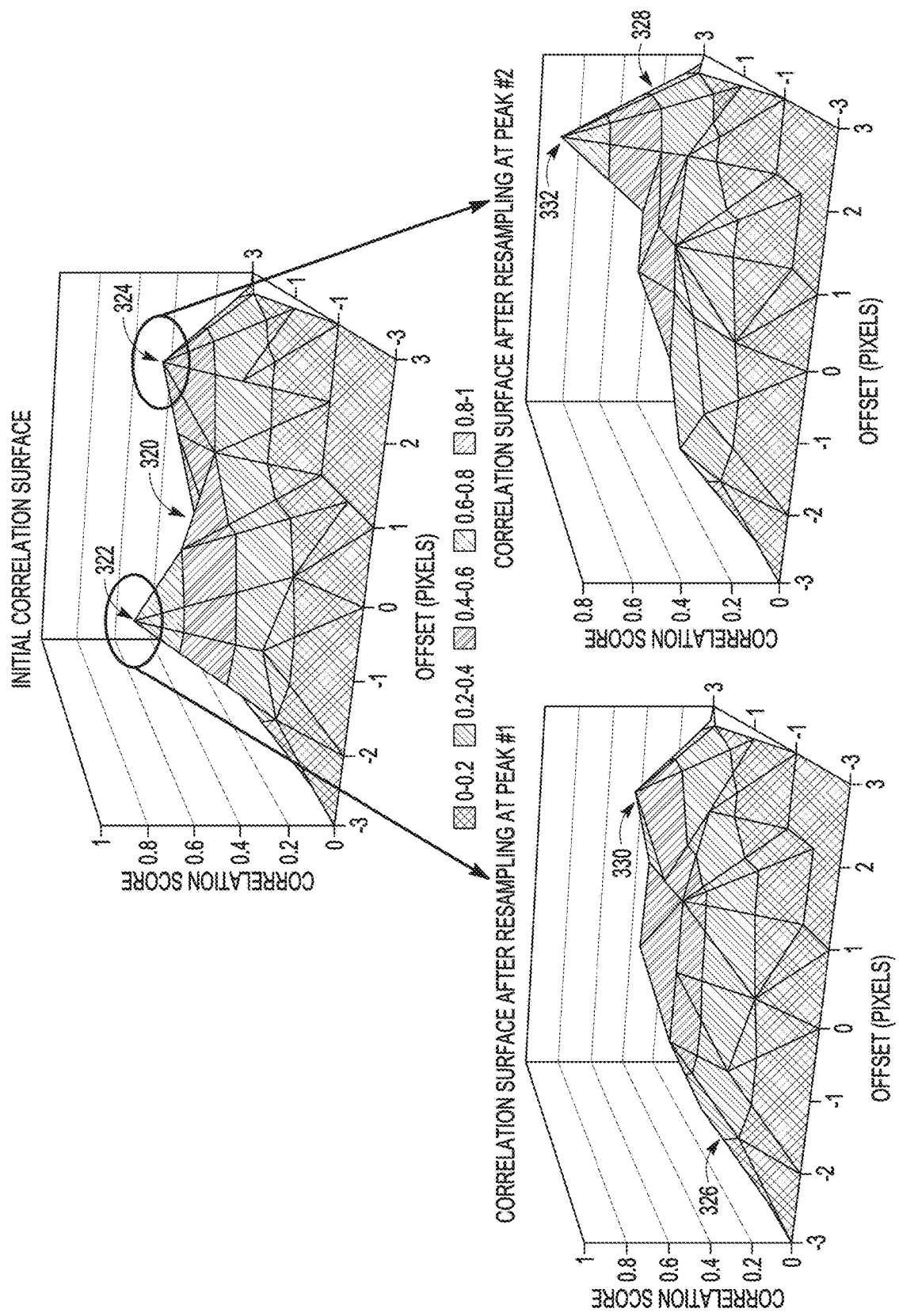

Referring now to FIGS. 8A and 8B, as mentioned, the resampling process may produce a resampled correlation surface, and hence FOM, that indicate a low confidence in an original pair of correlation offsets X and Y that had initially appeared to have high confidence. Accordingly, the computer-implemented system may be configured to correlate the local template window to the search window to generate a correlation surface 320 (step 300). The system extracts multiple pairs of correlation offsets X and Y (steps 302 and 304) from a primary peak 322 and a secondary peak 324 in the initial correlation surface 320, in this example $1^{st}$ and $2^{nd}$ pairs. For example, the system may extract correlation offsets from the highest and next highest peaks or from the highest peak and the next highest peak that is at least a radius R away from the highest peak. In this case, the computer-implemented system resamples the pixel values of the template and/or search windows for each of the first and second pairs of correlation offsets X and Y (steps 306 and 308) and uses the resampled pixel values to correlate the windows to generate first and second resampled correlation surfaces 326 and 328, respectively (steps 310 and 312). The system computes a FOM (steps 314 and 316) for primary peaks 330 and 332 in the resampled correlation surfaces 326 and 328, respectively and accepts the correlation (and pair of correlation offsets X and Y) with the strongest FOM (assuming it independently satisfies a threshold condition for acceptance) (step 318). In this example, the initial primary peak 322, which looks sharp at first, turns out to be poorly defined in the resampled correlation surface 326, whereas the secondary peak 324 actually displays a stronger peak 332 when its offsets are used for the resampling. If the secondary candidate offset peak was not evaluated in this case, this correlation would have been rejected entirely due to the poor resampled correlation surface of the initial primary peak offset, when in fact there was a good correlation offset available.

Resampled image cross-correlation can be applied to any type of imagery. Generally speaking the resampled process is providing a more accurate correlation surface to represent the underlying image correlation. A particular application in which resampled image cross-correlation may be useful is in the detection of moving vehicles.

A particular class of remote sensing (RS) images includes multi-band images that include first and second sets of band images that are collected with a time lag. For example, WorldView images, WV-2 or WV-3, are 8-band images. The first set includes Near-IR2 (860-1040 nm), Coastal Blue (400-450 nm), Yellow (585-625 nm) and Red-Edge (705-745 nm) and the second set includes Blue (450-510 nm), Green (520-580 nm, Red (630-690 nm) and Near-IR1 (770-895 nm). There is a time lag of 0.2-0.3 seconds between the collection of the band images in the first and second sets. Other multi-band images the exhibit a suitable time lag between at least two bands may be used.

The resampled image cross-correlator can be adapted to detect sub-pixel or greater vehicle motion from a single multi-band image. The system forms first and second pseudo-pan images as a weighted average of one or more band images in the first set and a weighted average of one or more band images in the second set, respectively. The first pseudo-pan image is segmented into a plurality of local template windows. For each local template window, the system correlates the local template window to a larger search window in the second pseudo-pan image to produce a correlation surface and extracts at least a pair of correlation offsets X and Y from the correlation surface for each template window. The system suitably rejects correlations where the correlation offsets X and Y are less than a first threshold as noise. The first threshold (TH1) 0<TH1<1 (for example, 0.5) to both reject noise and still capture sub-pixel motion. The system resamples the pixel values within the local template window of the first pseudo-pan image or the search window of the second pseudo-pan image using the fractional portions of the X and Y correlation offsets and uses the resampled pixel values to correlate the local template window in the first pseudo-pan image to the search window in the second pseudo-pan image to produce a resampled correlation surface. The system computes a Figure of Merit (FOM) for a peak in the resampled correlation surface and removes those correlations whose FOM is less than a second threshold (TH2) with the remaining correlations detecting moving vehicles in the single multi-band image.

In different embodiments, the fraction portions of correlation offsets extracted from the resampled correlation surface may be used as the FOM. The resampling may be iterated to improve the accuracy of the correlation offsets and resampled correlation surface. The fractional portion of the iterated correlation offsets defines uncertainty in the measurement and may be used to estimate speed uncertainty of the detected moving vehicle. The resampled image cross-correlator may process multiple pairs of correlation offsets X and Y in parallel and accept the pair having the strongest FOM.

The resampled image-cross correlator may use the traditional Least Squares Correlation (LSC) or Normalized Cross Correlation (NCC) to compute the correlation or may use a variant that is specifically designed for moving vehicle detection.

Figure 9:
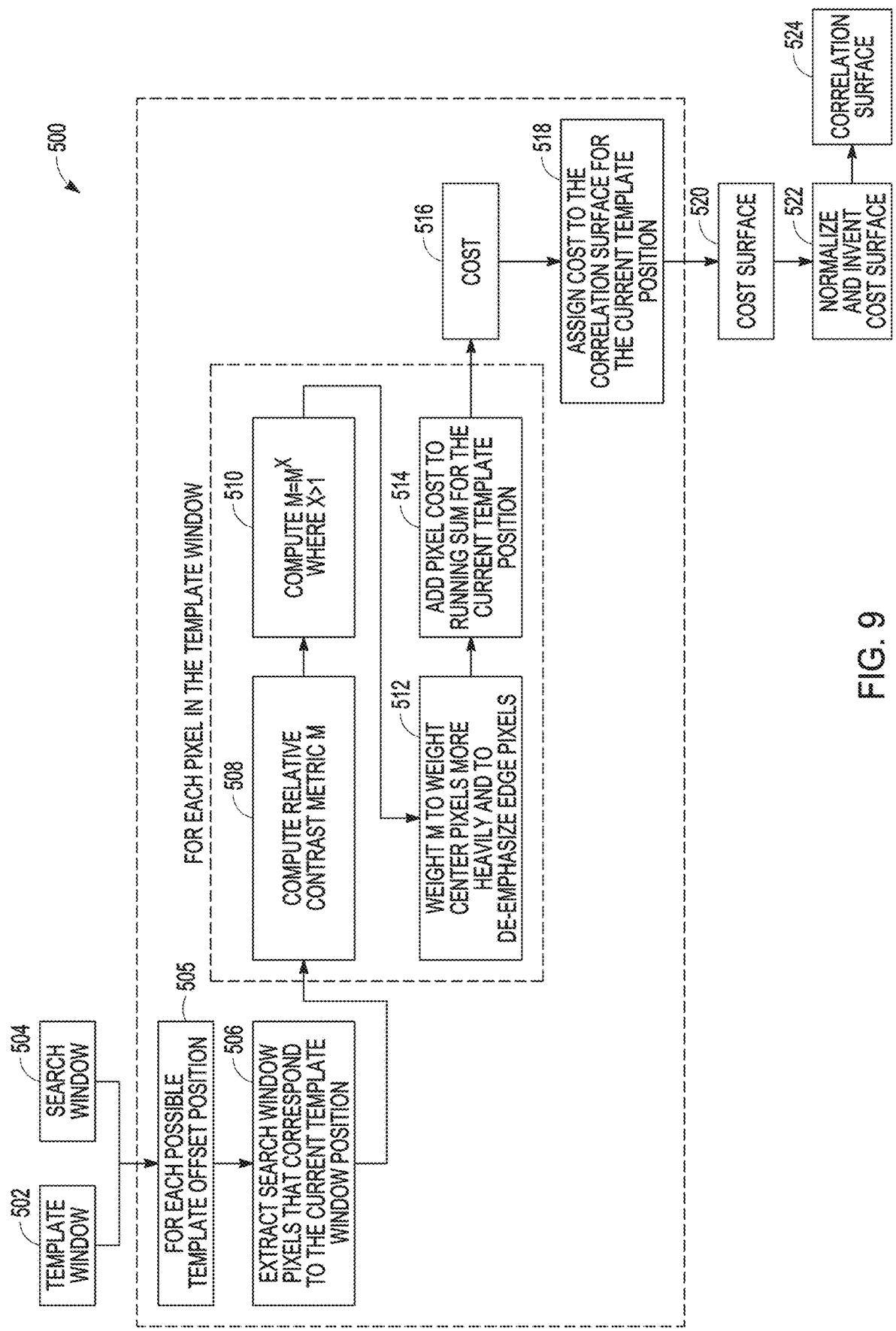
FIG. 9 is a flow diagram illustrating a particular cost-function for image cross-correlation configured to detect moving objects in the images.

Referring to FIG. 9, a correlation 500 tailored to moving vehicle detection modifies the cost function to more heavily weight central pixels (i.e., vehicle pixels at the center of the windows) and to de-emphasize content that might cause FAs such as mixed pixels along road edges. The correlation is more sensitive to small objects and less sensitive to noise. The result is more true moving vehicle detections with sub-pixel measurement and fewer false alarms.

Correlation 500 slides a template window 502 across a somewhat larger search window 504 to extract search window pixels that correspond to the current template window position (step 506) for each possible template offset position (step 505) within the search window. For each pixel in the template window, the correlation computes a relative contrast metric M between the corresponding pixels in the first and second pseudo-pan images (step 508). For example, $M=(pT-pS)/(pT+pS)*100$ where pT and pS are the pixel values in the template and search windows in the first and second pseudo-pan images. The metric M is raised to an exponent X e.g. $M=M^x$ where X>1 to penalize large differences more heavily (step 510). A weight factor W is applied to the metric M (M=W(M) to weight center pixels more heavily and to de-emphasize edge pixels to emphasize vehicles (step 512). For example, W=1 for center pixels and W=0.25 for edge pixels. The pixel costs M are added in a running sum for the current template (step 514) to generate a total cost (step 516) that is assigned to the correlation surface for the current template position (step 518). The total costs for each possible template offset position generate a cost surface (step 520). This correlation surface 524 is normalized and inverted (step 522) so that high costs have a low score and low costs have a high correlation score. A low cost score representing the alignment of a vehicle in the template and search windows will have a high correlation score e.g. a sharp peak in the correlation surface.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:
1. A method of image cross correlation, comprising:
   a) correlating a first window in a first image to a second larger window in a second image to produce a correlation surface;
   b) first extracting at least one first pair of correlation offsets X and Y from the correlation surface, said correlation offsets X and Y being real numbers including fractional portions capable of representing fractional offsets;
   c) resampling the pixel values within the first window of the first image or the second larger window of the second image using only the fractional portions of the correlation offsets X and Y;
   d) using the resampled pixel values to correlate the first window in the first image to the second larger window in the second image to produce a resampled correlation surface; and
   e) extracting at least one final pair of correlation offsets X and Y from the resampled correlation surface, said at least one final pair of correlation offsets X and Y being real numbers including both non-zero fractional and non-zero integer portions.

2. The method of claim 1, wherein the correlation in step (a) comprises,
   correlating the first window in the first image to the second larger window in the second image at integer pixel steps to produce discrete values of the correlation surface at integer pixel locations in X and Y dimensions; and
   fitting a continuous surface to the discrete values to form the correlation surface with sub-pixel accuracy.

3. The method of claim 1, further comprising:
   f) iterating steps b, c and d with the resampled correlation surface to improve the accuracy of the correlation offsets X and Y; and
   g) computing an offset uncertainty for the at least one final pair of correlation offsets X and Y from range and variation of the plurality of the fractional offsets from the preceding iterations.

4. The method of claim 3, further comprising:
   h) using this offset uncertainty to compute uncertainty in physical measurements derived from the correlation offsets.

5. The method of claim 1, further comprising:
   computing a figure of merit (FONT) for a peak in the resampled correlation surface; and
   accepting or rejecting the at least one final pair of correlation offsets X and Y based on the FOM.

6. The method of claim 5, wherein the FOM is computed by comparing the fractional portions of the at least one final pair of correlation offsets X and Y to a specified tolerance from an integer value.

7. The method of claim 5, wherein a plurality of first windows in the first image are correlated to a plurality of larger second windows in the second image to generate a plurality correlation surfaces from which a plurality of first pairs of correlation offsets X and Y are extracted, resampled and correlated to generate a plurality of resampled correlation surfaces from which each FOM is computed and used to accept or reject each final pair of correlation offsets X and Y.

8. The method of claim 7, further comprising:
   using the accepted final pairs of correlation offsets X and Y as tie-points to register and resample the first image to the second image.

9. A method of image cross correlation, comprising:
a) correlating a plurality of first windows in a first image to a plurality of second larger windows in a second image to produce a plurality of correlation surfaces;
b) extracting a plurality of pairs of correlation offsets X and Y from the correlation surface, said correlation offsets X and Y being real numbers including fractional portions capable of representing fractional offsets;
c) resampling the pixel values within the first window of the first image or the second larger window of the second image using the fractional portions of the plurality of pairs of correlation offsets X and Y; and
d) using the resampled pixel values to correlate the first window in the first image to the second larger window in the second image to produce a plurality of resampled correlation surfaces;
e) computing a figure of merit (FOM) for a peak in the plurality of resampled correlation surfaces;
f) extracting at least one final pair of correlation offsets X and Y from the resampled correlation surface;
g) accepting or rejecting each final pair of correlation offsets X and Y based on the FOM;
h) for the accepted final pairs of correlation offsets X and Y, extracting pairs of integer-valued correlation offsets X and Y from the resampled correlation surfaces, and
i) using the pairs of integer-valued correlation offsets X and Y as tie-points to register the resampled first image to the second image without resampling.

10. The method of claim 7, further comprising:
using the accepted final pairs of correlation offsets X and Y as tie-points to correct for errors in image data associated with the first and second images.

11. The method of claim 7, further comprising:
using the accepted final pairs of correlation offsets X and Y as tie-points to extract elevations to render a 3D object.

12. The method of claim 7, wherein the first and second images are from first and second sets of band images, respectively, in a single multi-band image in which the first and second sets of images are collected with a relative time lag, wherein accepted final pairs of correlation offsets X and Y detect moving vehicles.

13. The method of claim 5, further comprising:
for the accepted final pairs of correlation offsets X and Y, extracting integer-valued correlation offsets X and Y from the resampled correlation surface; and
outputting the resampled window with the integer-valued correlation offsets X and Y.

14. The method of claim 5, further comprising:
in step b), extracting a second pair of correlation offsets X and Y from the correlation surface,
in step c), resampling the pixel values within the first window of the first image or the second larger window of the second image using fractional portions of the second pair of correlation offsets X and Y;
in step d), using the resampled pixel values for the second pair to correlate the first window in the first image to the second larger window in the second image to produce a second resampled correlation surface;
extracting a second final pair of correlation offsets X and Y from the second resampled correlation surface;
computing a FOM for a peak in the second resampled correlation surface; and
accepting one of the final and second final pair of correlation offsets X,Y based on their respective FOMs.

15. A method of image cross correlation to detect moving vehicles, comprising:
receiving a single multi-band image including a first set of band images and a second set of band images collected with a time lag relative to the first set;
forming first and second pseudo-pan images as a weighted average of one or more band images in the first set and a weighted average of one or more band images in the second set, respectively,
segmenting the first pseudo-pan image into a plurality of local template windows; for each local template window,
a) correlating each local template window to a larger search window in the second pseudo-pan image to produce a correlation surface;
b) extracting at least one pair of correlation offsets X and Y from the correlation surface for each template window, said correlation offsets X and Y being real numbers including fractional portions capable of representing fractional offsets;
c) rejecting correlations where the correlation offsets X and Y are less than a first threshold;
d) resampling the pixel values within the local template window of the first pseudo-pan image or the search window of the second pseudo-pan image using the fractional portions of the X and Y correlation offsets;
e) using the resampled pixel values to correlate the local template window in the first pseudo-pan image to the search window in the second pseudo-pan image to produce a resampled correlation surface; and
f) computing a Figure of Merit (EOM) for a peak in the resampled correlation surface; and
g) removing those correlations whose FOM is less than a second threshold with the remaining correlations detecting moving vehicles in the single multi-band image.

16. The method of claim 15, wherein the step of correlating each local template window to the larger search window further comprises:
for each possible template offset position relative to the larger search window, extracting pixels from the search window that correspond to the template offset position;
for each pixel in the template window,
computing a relative contrast metric M from pixel values in the template and search windows for the first and second pseudo-pan images, respectively;
raising the relative contrast metric M to a power X where X>1;
weighting the M to emphasize center pixels in the template window and de-emphasize edge pixels in the template window; and
computing a running sum of the metric M as a cost;
assigning the cost to the correlation surface for each template offset position.

17. The method of claim 15, wherein the FOM is computed by extracting a final pair of correlation offsets X and Y including fractional portions from the resampled correlation surface and comparing the fractional portions of the final pair of correlation offsets X and Y to a specified tolerance from an integer value.

18. The method of claim 15, further comprising:
iterating at least steps b through e to improve the accuracy of the at least one pair of correlation offsets X and Y.

19. The method of claim 18, further comprising:
computing an offset uncertainty for the at least one final pair of correlation offsets X and Y from range and variation of the plurality of the fractional offsets from the preceding iterations, and using the offset uncertainty to estimate speed uncertainty of the detected moving vehicle.

20. The method of claim 15, further comprising:

in step b), extracting a second pair of correlation offsets X and Y including fractional portions from the correlation surface, in step d), resampling the pixel values within the local template window of the first pseudo-pan image or the larger search window of the second pseudo-pan image using fractional portions of the second pair of correlation offsets X and Y;

in step e), using the resampled pixel values for the second pair to correlate the local template window in the first pseudo-pan image to the search window in the second pseudo-pan image to produce a second resampled correlation surface;

extracting first and second final pairs of correlation offsets X and Y from the respective resampled correlation surfaces;

computing a FOM for a peak in the second resampled correlation surface; and accepting one of the final and second final pair of correlation offsets X,Y based on their respective FOMs.

21. A method of image cross correlation, comprising:

a) correlating a first window in a first image to a second larger window in a second image to produce a correlation surface;

b) first extracting at least one first pair of correlation offsets X and Y from at least one peak in the correlation surface, said correlation offsets X and Y being real numbers including at least fractional portions capable of representing fractional offsets;

c) resampling the pixel values within the first window of the first image or the second larger window of the second image using only the fractional portions of the correlation offsets X and Y;

d) using the resampled pixel values to correlate the first window in the first image to the second larger window in the second image to produce a resampled correlation surface;

e) iterating steps b, c and d with the resampled correlation surface at least once to improve the accuracy of the at least one first pair of correlation offsets X and Y by driving the fractional portions to zero to sharpen the peaks in the resampled correlation surface until convergence or oscillation is reached;

f) extracting at least a final pair of correlation offsets X and Y from the resampled correlation surface, said at least final pair of correlation offsets X and Y including both non-zero integer and non-zero fractional portions;

g) computing an offset uncertainty for the at least one final pair of correlation offsets X and Y from range and variation of the plurality of the fractional offsets from the preceding iterations, and h) outputting at least one of, the offset uncertainty;

the at least one final pair of correlation offsets X and Y as tie points that define the registration between the original first and second images; and at least one pair of integer-valued correlation offsets X and Y from the at least one final pair of correlation offsets as tie points do define the registration between the resampled pixels values within the first window of the first image or the second larger window of the second image.

22. The method of claim 21, wherein the correlation offsets X and Y correspond to an object in the first and second images, further comprising:

using the offset uncertainty to estimate speed uncertainty of a moving object.

23. A method of image cross correlation to detect moving objects, comprising:

receiving a single multi-band image including a first set of band images and a second set of band images collected with a time lag relative to the first set;

forming first and second pseudo-pan images as a weighted average of one or more band images in the first set and a weighted average of one or more band images in the second set, respectively, segmenting the first pseudo-pan image into a plurality of local template windows; for each local template window, a) correlating each local template window to a larger search window in the second pseudo-pan image to produce a correlation surface;

b) extracting at least one pair of correlation offsets X and Y from the correlation surface for each template window, said correlation offsets X and Y being real numbers including fractional portions capable of representing fractional offsets;

c) rejecting correlations where the correlation offsets X and Y are less than a first threshold;

d) resampling the pixel values within the local template window of the first pseudo-pan image or the search window of the second pseudo-pan image using the fractional portions of the X and Y correlation offsets;

e) using the resampled pixel values to correlate the local template window in the first pseudo-pan image to the search window in the second pseudo-pan image to produce a resampled correlation surface; and f) computing a Figure of Merit (FOM) for a peak in the resampled correlation surface; and g) removing those correlations whose FOM is less than a second threshold with the remaining correlations detecting moving objects in the single multi-band image.

24. The method of claim 23, further comprising:

iterating at least steps b through e to improve the accuracy of the at least one pair of correlation offsets X and Y; and computing an offset uncertainty for the at least one final pair of correlation offsets X and Y from the range and variation of the plurality of the fractional offsets from the preceding iterations.

25. The method of claim 24, further comprising:

using this offset uncertainty to compute uncertainty in physical measurements of the object derived from the correlation offsets.

26. The method of claim 25, wherein the physical measurement is an estimated speed of the detected moving object.

27. The method of claim 24, further comprising:

extracting at least a final pair of correlation offsets X and Y from the resampled correlation surface, said correlation offsets X and Y including both non-zero integer and non-zero fractional portions;

computing a total offset of the at least one object as the non-zero integer portion of the final pair of correlation offsets X and Y plus a running summation of the fractional portions of the first pair of correlation offsets X and Y from preceding iterations.

\* \* \* \* \*

UNITED STATES PATENT AND TRADEMARK OFFICE
CERTIFICATE OF CORRECTION

| | | |
|---|---|---|
| PATENT NO. | : 11,915,435 B2 | Page 1 of 1 |
| APPLICATION NO. | : 17/378113 | |
| DATED | : February 27, 2024 | |
| INVENTOR(S) | : Grant B. Boroughs | |

It is certified that error appears in the above-identified patent and that said Letters Patent is hereby corrected as shown below:

On the Title Page

In item (71), in "Applicant", in Column 1, Line 1, delete "Waltham," and insert --Tewksbury,-- therefor In the Specification In Column 1, Line 36, delete "1A-IC," and insert --1A-1C,-- therefor In the Claims In Column 10, Line 26, in Claim 2, delete "comprises," and insert --comprises:-- therefor In Column 10, Line 47, in Claim 5, delete "(FONT)" and insert --(FOM)-- therefor In Column 12, Line 32, in Claim 15, delete "(EOM)" and insert --(FOM)-- therefor In Column 14, Line 51, in Claim 24, after "from", delete "the"

Signed and Sealed this
Seventeenth Day of December, 2024

Derrick Brent
*Acting Director of the United States Patent and Trademark Office*